(12) United States Patent
Cheng

(10) Patent No.: US 10,989,941 B2
(45) Date of Patent: Apr. 27, 2021

(54) DRIVE CIRCUIT BOARD CONNECTION STRUCTURE AND DISPLAY DEVICE

(71) Applicants: HKC CORPORATION LIMITED, Guangdong (CN); CHONGQING HKC OPTOELECTRONICS TECHNOLOGY CO., LTD., Chongqing (CN)

(72) Inventor: Jiahe Cheng, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/637,133

(22) PCT Filed: Sep. 21, 2017

(86) PCT No.: PCT/CN2017/102623
§ 371 (c)(1),
(2) Date: Feb. 6, 2020

(87) PCT Pub. No.: WO2019/028975
PCT Pub. Date: Feb. 14, 2019

(65) Prior Publication Data
US 2020/0183216 A1 Jun. 11, 2020

(30) Foreign Application Priority Data
Aug. 8, 2017 (CN) .......................... 201710671312.9

(51) Int. Cl.
*G02F 1/1333* (2006.01)
*G02F 1/1345* (2006.01)

(52) U.S. Cl.
CPC .... *G02F 1/133308* (2013.01); *G02F 1/13452* (2013.01); *G02F 1/133305* (2013.01)

(58) Field of Classification Search
CPC .......... G02F 1/133308; G02F 1/13452; G02F 1/133305
(Continued)

(56) References Cited

U.S. PATENT DOCUMENTS

2006/0044745 A1* 3/2006 Kim ...................... G06F 1/1601
361/679.22

FOREIGN PATENT DOCUMENTS

CN     101464572 A    6/2009
CN     101865404 A    10/2010
(Continued)

*Primary Examiner* — Charles S Chang
(74) *Attorney, Agent, or Firm* — Muncy, Geissler, Olds & Lowe, P.C.

(57) ABSTRACT

A drive circuit board connection structure having a back cover, drive circuit board disposed on one side of the back cover, and connector. The connector has a body connected between the back cover and drive circuit board, a first connection portion and second connection portion respectively joined to two ends of the body, and an elastic support portion which is disposed on the body and located between the back cover and the drive circuit board. The first connection portion is connected to the back cover. The second connection portion and the elastic support portion respectively push against two opposite side surfaces of the drive circuit board. A display device is also provided.

13 Claims, 6 Drawing Sheets

(58) Field of Classification Search
USPC .................................................. 349/149–152
See application file for complete search history.

(56) References Cited

FOREIGN PATENT DOCUMENTS

| | | |
|---|---|---|
| CN | 101923230 A | 12/2010 |
| CN | 201967287 U | 9/2011 |
| CN | 202425258 U | 9/2012 |
| CN | 106455400 A | 2/2017 |
| CN | 206312514 U | 7/2017 |
| JP | 2014038762 A | 2/2014 |

\* cited by examiner

DRIVE CIRCUIT BOARD CONNECTION STRUCTURE AND DISPLAY DEVICE

BACKGROUND OF THE INVENTION

Field of Invention

This disclosure relates to a technical field of a display device, and more particularly to a drive circuit board connection structure and a display device.

Related Art

With the advancement of technology, people are increasingly pursuing the quality of life, and more and more curved surface liquid crystal televisions on the market are loved by people because they have advantages, such as a wide range of viewing angles, good image uniformity and the like. The good or bad imaging of the curved surface liquid crystal television mainly depends on the imaging effect of the curved surface liquid crystal display screen, and in order to display images, the curved surface liquid crystal display screen needs to be driven by the drive circuit board.

At present, the assembly method attached to the screw lock is commonly used in the drive circuit board to fix the drive circuit board onto the back cover of the curved surface liquid crystal television, and the drive circuit board is connected to the curved surface liquid crystal display screen only through chip on flex/chip on film (COF, often called as the flexible circuit unit) for signal transmission. However, because the curved surface liquid crystal display screen has a range of tolerances when being mounted on the back cover, the curved surface liquid crystal television in the transporting process has some displacement when the curved surface liquid crystal display screen is subjected to the vibration. If the relative displacement between the curved surface liquid crystal display screen and the drive circuit board is too large, the COF is pulled and damaged, thereby resulting in the poor imaging quality or no imaging in the curved surface liquid crystal television.

SUMMARY OF THE INVENTION

An objective of this disclosure is to provide a drive circuit board connection structure and a display device to solve a technical problem that in the existing technology, the existing assembly methods can not satisfy a movable margin required by the drive circuit board.

To achieve the above objective, the disclosure provides a drive circuit board connection structure used in a display device. The drive circuit board connection structure comprises a back cover, a drive circuit board and a connector. The drive circuit board is disposed on one side of the back cover. The connector is connected between the back cover and the drive circuit board. The connector comprises a body, a first connection portion, a second connection portion and an elastic support portion. The body is connected between the back cover and the drive circuit board. The first connection portion is joined to one end of the body and connected to the back cover. The second connection portion is joined to the other end of the body. The elastic support portion is disposed on the body and located between the back cover and the drive circuit board. The elastic support portion and the second connection portion respectively push against two opposite side surfaces of the drive circuit board.

In one embodiment, a first snap is disposed on the first connection portion, a first mounting hole adapted to the first snap is formed on the back cover, and the first connection portion passes through the first mounting hole through the first snap to snap to the back cover. A second snap is disposed on the second connection portion, a second mounting hole adapted to the second snap is formed on the drive circuit board, and the second connection portion passes through the second mounting hole to snap to the drive circuit board through the second snap.

In one embodiment, an outer peripheral surface of the first connection portion is provided with an external thread, a thread hole having an internal thread adapted to the external thread is formed on the back cover, and the first connection portion is screwed into the thread hole to position the back cover. A second snap is disposed on the second connection portion, a second mounting hole adapted to the second snap is formed on the drive circuit board, and the second connection portion passes through the second mounting hole to snap to the drive circuit board through the second snap.

In one embodiment, the second snap comprises a guide surface and a slot. The guide surface is used to guide the second snap to pass through the second mounting hole. The slot is used to provide a deformation margin or cooperating with mounting of the first connection portion.

In one embodiment, a surface of a junction of the elastic support portion and the body is an arced surface.

In one embodiment, the junction of the elastic support portion and the body has an arc-shaped surface.

In one embodiment, the elastic support portion comprises at least two support branches. The support branches comprise a root forming an arc transition with the body, and a second protruding portion pushing against the drive circuit board. The second protruding portion is joined to the root.

In one embodiment, the support branches further comprise a first protruding portion pushing against the back cover, and the first protruding portion is joined to the root.

In one embodiment, the support branches are distributed over an outer peripheral surface of the body with equal intervals.

The drive circuit board connection structure provided by this disclosure employs the connector including the body, the first connection portion, the second connection portion and the elastic support portion, so that the drive circuit board is connected with the backplane while having the movable margin. The drive circuit board may move a predetermined distance in a direction from the body to the back cover, thereby effectively solving a technical problem that the assembly method can not satisfy the movable margin required by the drive circuit board, and improving the reliability of the drive circuit board connection structure.

The disclosure also provides a drive circuit board connection structure used in a display device. The drive circuit board connection structure comprises a back cover, a drive circuit board and a connector. The drive circuit board is disposed on one side of the back cover. The connector is connected between the back cover and the drive circuit board. The connector comprises a body, a first connection portion, a second connection portion and an elastic support portion. The body is connected between the back cover and the drive circuit board. The first connection portion is joined to one end of the body. A first snap is disposed on the first connection portion. A first mounting hole adapted to the first snap is formed on the back cover. The first connection portion passes through the first mounting hole through the first snap to snap to the back cover. The second connection portion is joined to the other end of the body. A second snap is disposed on the second connection portion. A second mounting hole adapted to the second snap is formed on the drive circuit board. The second connection portion passes through the second mounting hole to snap to the drive circuit board through the second snap. The elastic support portion is disposed on the body and located between the back cover and the drive circuit board. The elastic support portion and the second snap respectively push against two opposite side surfaces of the drive circuit board. The elastic support portion comprises at least two support branches. The support branches are distributed over an outer peripheral surface of the body with equal intervals. The support branches comprise a root forming an arc transition with the body and a second protruding portion pushing against the drive circuit board. The second protruding portion is joined to the root.

The drive circuit board connection structure provided by this disclosure employs the connector including the body, the first connection portion, the second connection portion and the elastic support portion, so that the drive circuit board is connected with the backplane while having the movable margin. The drive circuit board may move a predetermined distance in a direction from the body to the back cover, thereby effectively solving a technical problem that the assembly method can not satisfy the movable margin required by the drive circuit board, and improving the reliability of the drive circuit board connection structure.

The disclosure also provides a display device. The display device comprises a display panel, the drive circuit board connection structure as mentioned above and a flexible circuit unit. The display panel is used to display an image. The drive circuit board connection structure as mentioned above is used to assemble the drive circuit board with the back cover. The flexible circuit unit has one end fixed and connected to the display panel, and the other end fixed and connected to the drive circuit board.

The display device provided by this disclosure employs the drive circuit board connection structure, so that the drive circuit board is connected with the backplane while having the movable margin. The drive circuit board may move a predetermined distance in a direction from the body to the back cover, thereby effectively solving the problem that the assembly method can not satisfy the movable margin required by the drive circuit board to automatically adjust its relative position to the display panel, and to avoid the damage of the flexible circuit unit. Thus, the safety of the flexible circuit unit in the transporting process is improved, and the normal operation of the display device is guaranteed.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

Figure 1:
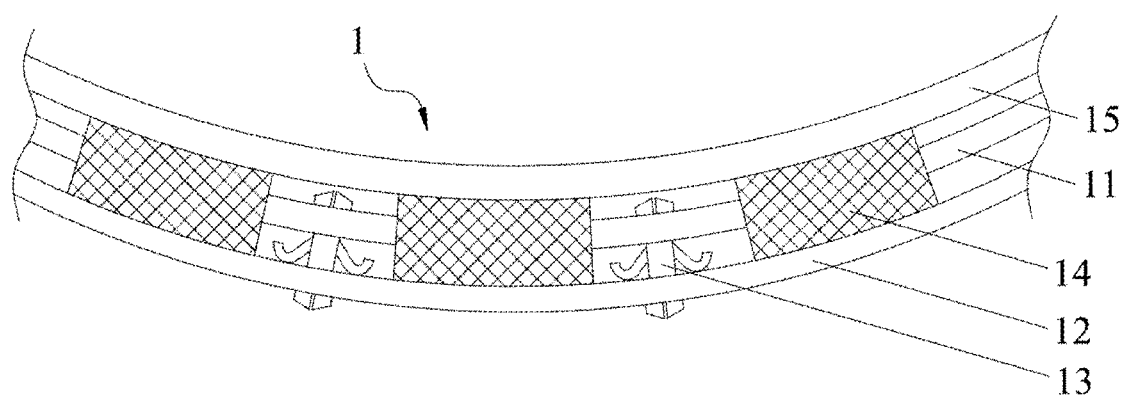
FIG. 1 is a schematic view showing the connection relationship between various components in a display device provided by an embodiment of this disclosure.

Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

In the description of this disclosure, it needs to be described that, unless otherwise expressly stated and limited, the terms "mount," "link" and "connect" should be broadly understood. For example, they may be the fixed connection, may be the detachable connection or may be the integral connection; may be the mechanical connection or may also be the electrical connection; or may be the direct connection, may be the indirect connection through a middle medium or may be the inner communication between two elements. It will be apparent to those skilled in the art that the specific meanings of the above terms in this application may be understood according to the specific conditions.

In the description of this disclosure, it is to be understood that the terms "center", "transversal", "up," "down," "left," "right," "vertical", "horizontal", "top," "bottom," "inside" and "outside" indicating the orientation or position relationships are the orientation or position relationships based on the drawing, are only provided for the purposes of describing this disclosure and simplifying the description, but do not indicate or imply that the directed devices or elements must have the specific orientations or be constructed and operated in the specific orientations, and thus cannot be understood as the restriction to this disclosure.

In addition, the terms "first," and "second" are used for the illustrative purpose only and cannot be understood as indicating or implying the relative importance or implicitly specifying the number of indicated technical features. Therefore, the features restricted by "first" and "second" may expressly or implicitly comprise one or multiple ones of the features. In the description of this disclosure, unless otherwise described, the meaning of "multiple" comprises two or more than two. In addition, the terms "comprises" and any modification thereof intend to cover the non-exclusive inclusions.

Figure 2:
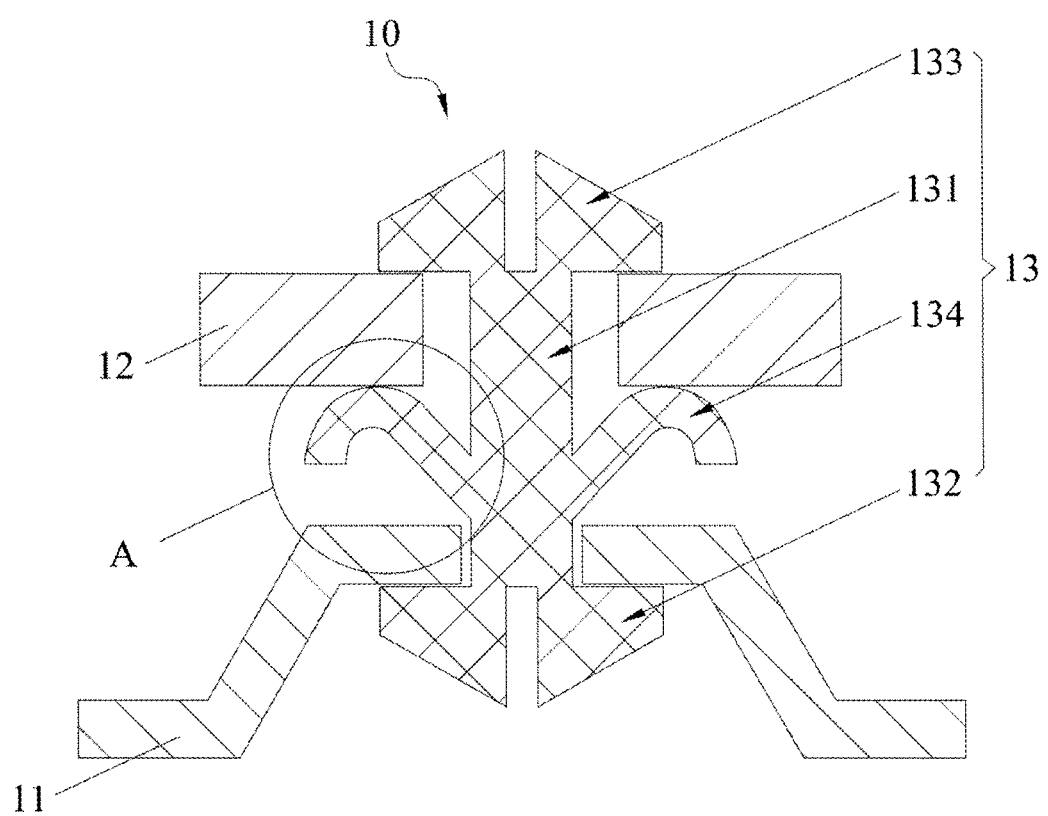
FIG. 2 is a schematically cross-sectional view showing a drive circuit board connection structure provided by an embodiment of this disclosure.

Referring to FIGS. 1 and 2, the drive circuit board connection structure provided by this disclosure will be described now. A drive circuit board connection structure 10 used in a display device 1 includes a back cover 11, a drive circuit board 12 and a connector 13, wherein the drive circuit board 12 is disposed on one side of the back cover 11, and the connector 13 connects between the back cover 11 and the drive circuit board 12. Here, the connector 13 includes a body 131, a first connection portion 132, a second connection portion 133 and an elastic support portion 134, wherein the body 131 may be a cylindrical or polygonal prism. Of course, according to actual situations and requirements, the body 131 may also have other shapes in other embodiments of this disclosure, so the shape is not restricted thereto. The body 131 passes through the back cover 11 and the drive circuit board 12, the first connection portion 132 and the second connection portion 133 are respectively joined to two ends of the body 131, the elastic support portion 134 has resilience and is disposed on the body 131, and the elastic support portion 134 is located between the back cover 11 and the drive circuit board 12. Here, the first connection portion 132 is connected to the back cover 11, and the second connection portion 133 and the elastic support portion 134 respectively push against two opposite side surfaces of the drive circuit board 12.

When assembled, the first connection portion 132 firstly pass through the back cover 11, and then the second connection portion 133 enters the drive circuit board 12 from one side of the drive circuit board 12 and runs out of the other side of the drive circuit board 12. At this time, the second connection portion 133 and the elastic support portion 134 respectively push against two opposite side surfaces of the drive circuit board 12, so that the drive circuit board 12 is interposed between the second connection portion 133 and the elastic support portion 134 to form the positioning. Because the elastic support portion 134 has resilience, the drive circuit board 12 has the movable margin, and may move a predetermined distance in a direction from the body 131 to the back cover 11.

The drive circuit board connection structure 10 provided by this disclosure employs the connector 13 including the body 131, the first connection portion 132, the second connection portion 133 and the elastic support portion 134, so that the drive circuit board 12 is connected with the backplane 11 while having the movable margin. The drive circuit board 12 may move a predetermined distance in a direction from the body 131 to the back cover 11, thereby effectively solving a technical problem that the assembly method can not satisfy the movable margin required by the drive circuit board, and improving the reliability of the drive circuit board connection structure.

Figure 5:
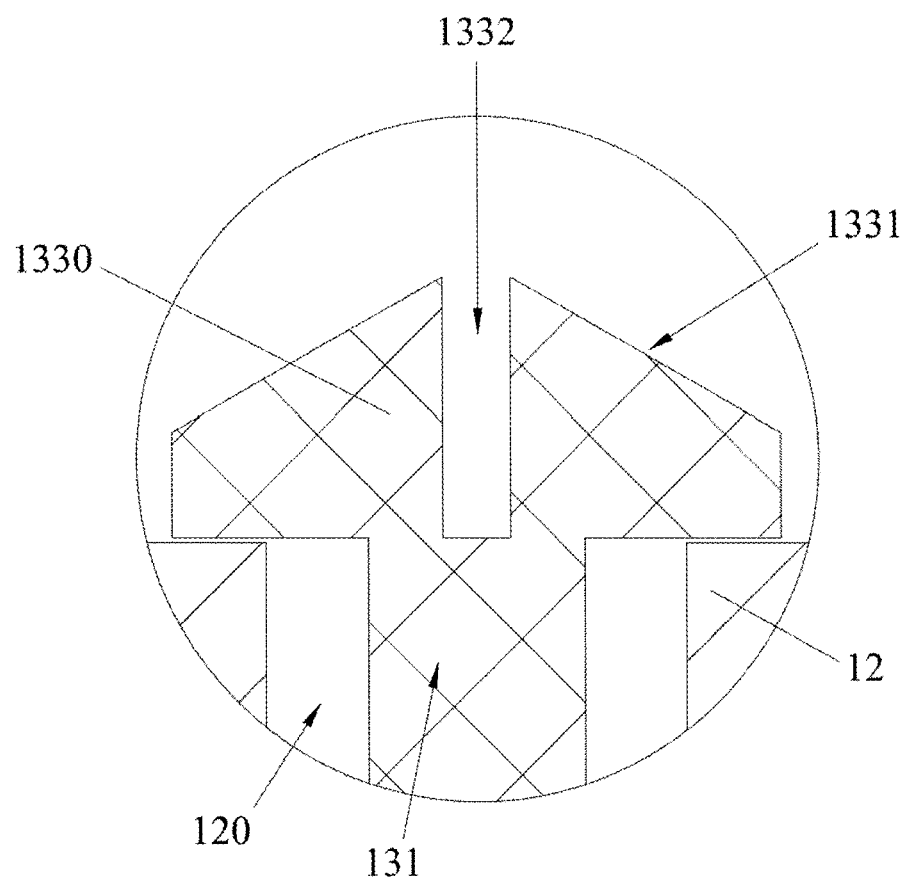
FIG. 5 is an enlarged schematic view showing a second snap in the drive circuit board connection structure provided by an embodiment of this disclosure.

In specific applications, referring to FIGS. 2 and 5, a first snap (not labeled) is disposed on the above-mentioned first connection portion 132, a second snap 1330 is disposed on the above-mentioned second connection portion 133. Meanwhile, a first mounting hole (not labeled) is formed on the above-mentioned back cover 11, the first mounting hole is adapted to the first snap, a second mounting hole 120 is formed on the above-mentioned drive circuit board 12, and the second mounting hole 120 is adapted to the second snap 1330. Here, the first connection portion 132 passes through the first mounting hole through the first snap to snap to the back cover 11, and the second connection portion 133 passes through the second mounting hole 120 through the second snap 1330 to snap to the drive circuit board 12.

In specific applications, referring to FIG. 5, the above-mentioned second snap 1330 includes a guide surface 1331 and a slot 1332, wherein the guide surface 1331 guides the second snap 1330 to pass through the second mounting hole 120, and the slot 1332 provides a deformation margin. Specifically, the second snap 1330 may have a round column shape, a conical shape or sphere shape with a cut. Of course, according to actual situations and requirements, in other embodiments of this disclosure, the second snap 1330 may also have other shapes, and the restriction is not made herein. A bottom volume of the second snap 1330 is large and a small top volume thereof is small. The aperture of the second mounting hole 120 is greater than the diameter of the top surface of the second snap 1330, and smaller than the diameter of the bottom surface of the second snap 1330. The guide surface 1331 is inclined from the center or the edge of the top toward the edge of the bottom. Meanwhile, the slot 1332 may be selected as a slotted groove, the width of which is less than the width of the body 131, and the slot 1332 penetrates through the second snap 1330 to communicate with the edge of the second snap 1330. Here, several slots 1332 are formed on the second snap 1330. When the number of slots 1332 is greater than or equal to 2, the multiple slots 1332 intersect and are equiangularly distributed, and all of which pass through the central axis of the second buckle 1330. When assembled, the top of the second snap 1330 firstly stretches into the second mounting hole 120 along the guide surface 1331. Under the squeeze of the second mounting hole 120, the slot 1332 gradually deforms and shrinks, so that the bottom volume of the second snap 1330 shrinks to pass through the second mounting hole 120. Then, in the case of the absence of squeeze of the second mounting hole 120, the slot 1332 returns to its original shape, and the second snap 1330 snaps to the drive circuit board 12.

In specific applications, referring to FIG. 2, the shapes and the structures of the above-mentioned first snap and the second snap 1330 are the same, the shapes and the structures of the above-mentioned first mounting hole and the second mounting hole 120 are the same, and no further details are given here.

Figure 6:
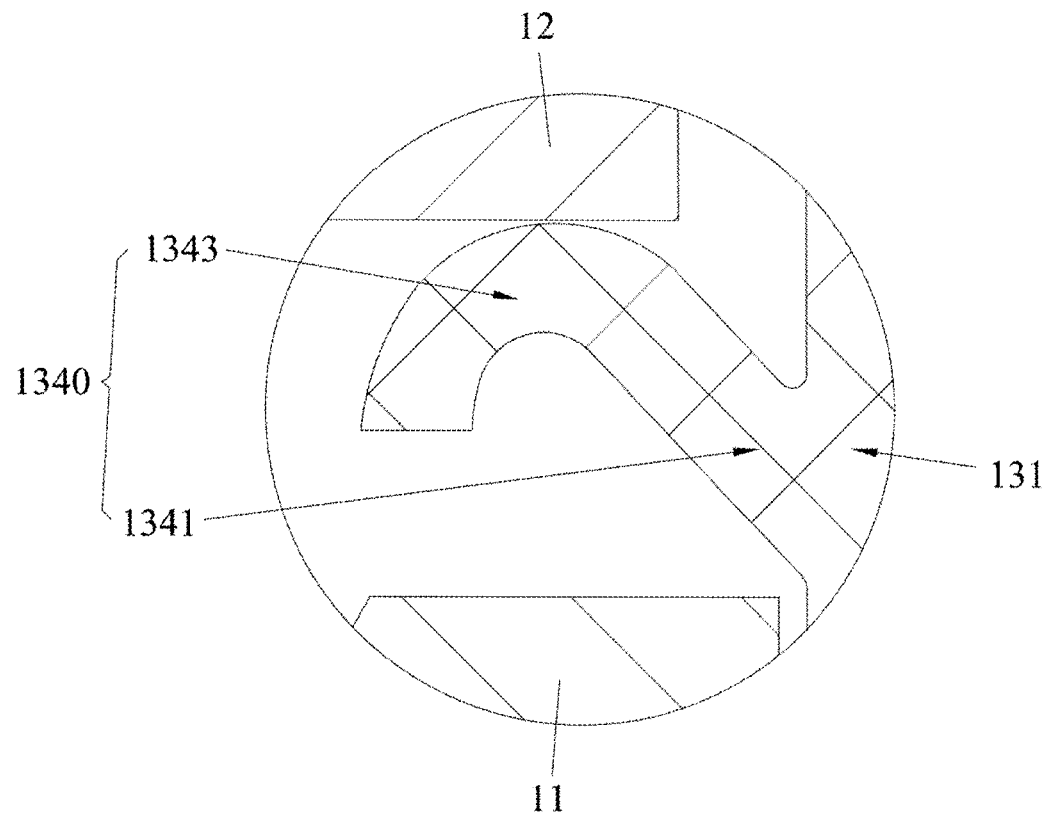
FIG. 6 is a enlarged schematic view showing A part in FIG. 2.

In specific applications, referring to FIG. 6, a surface of a junction of the above-mentioned elastic support portion 134 and the body 131 is an arced surface, that is, the junction of the elastic support portion 134 and the body 131 has an arc-shaped surface. As such, the anti-tear strength at the junction between the elastic support portion 134 and the body 131 is made higher.

In specific applications, referring to FIG. 6, the above-mentioned elastic support portion 134 includes at least two support branches 1340, the support branch 1340 includes a root 1341 and a second protruding portion 1343, wherein the root 1341 forms an arc transition with the body 131, and the second protruding portion 1343 pushes against the drive circuit board 12. Here, the second protruding portion 1343 is joined to the root 1341. Specifically, the support branch 1340 has resilience, the second protruding portion 1343 may swing up and down about the root 1341. When the drive circuit board 12 is subjected to a downward external force, the drive circuit board 12 may press the second protruding portion 1343 to swing downward, thereby achieving the movement of the drive circuit board 12 away from the second connection portion 133 toward the side where the back cover 11 is located.

In specific applications, the above-mentioned support branches 1340 are distributed over an outer peripheral surface of the body 131 with equal intervals. As such, the drive circuit board 12 is more uniformly forced, and better positioned.

Figure 3:
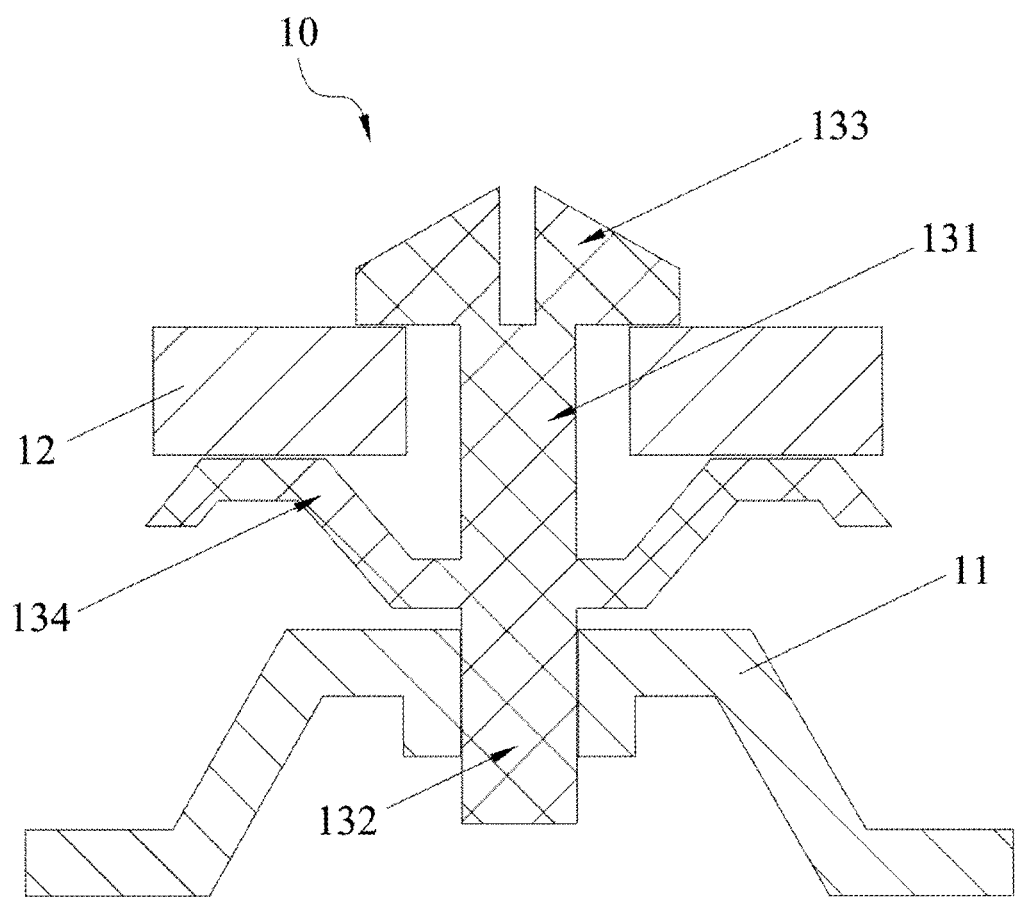
FIG. 3 is a schematically cross-sectional view showing a drive circuit board connection structure provided by another embodiment of this disclosure.

In one embodiment, referring to FIG. 3, the drive circuit board connection structure provided by an embodiment of this disclosure and the drive circuit board connection structure disclosed in the above-mentioned embodiment are basically the same except for the different that: an external thread (not shown) is formed on the outer peripheral surface of the first connection portion 132, while a thread hole (not labeled) is formed on the back cover 11, wherein the thread hole has an internal thread adapted to the external thread. Here, the first connection portion 132 is screwed into the thread hole to form the positioning with the back cover 11, that is, the first connection portion 132 and the back cover 11 are fixed and connected through the cooperation of the internal and external threads.

Upon assembling, a screwdriver may be inserted into the slot 1332 and forced to firstly screw the first connection portion 132 into the thread hole to connect to the back cover 11, and then the second connection portion 133 enters the drive circuit board 12 from one side of the drive circuit board 12 and runs out of the other side of the drive circuit board 12. At this time, the second connection portion 133 and the elastic support portion 134 respectively push against two opposite side surfaces of the drive circuit board 12, so that the drive circuit board 12 is interposed between the second connection portion 133 and the elastic support portion 134 to form the positioning.

Figure 4:
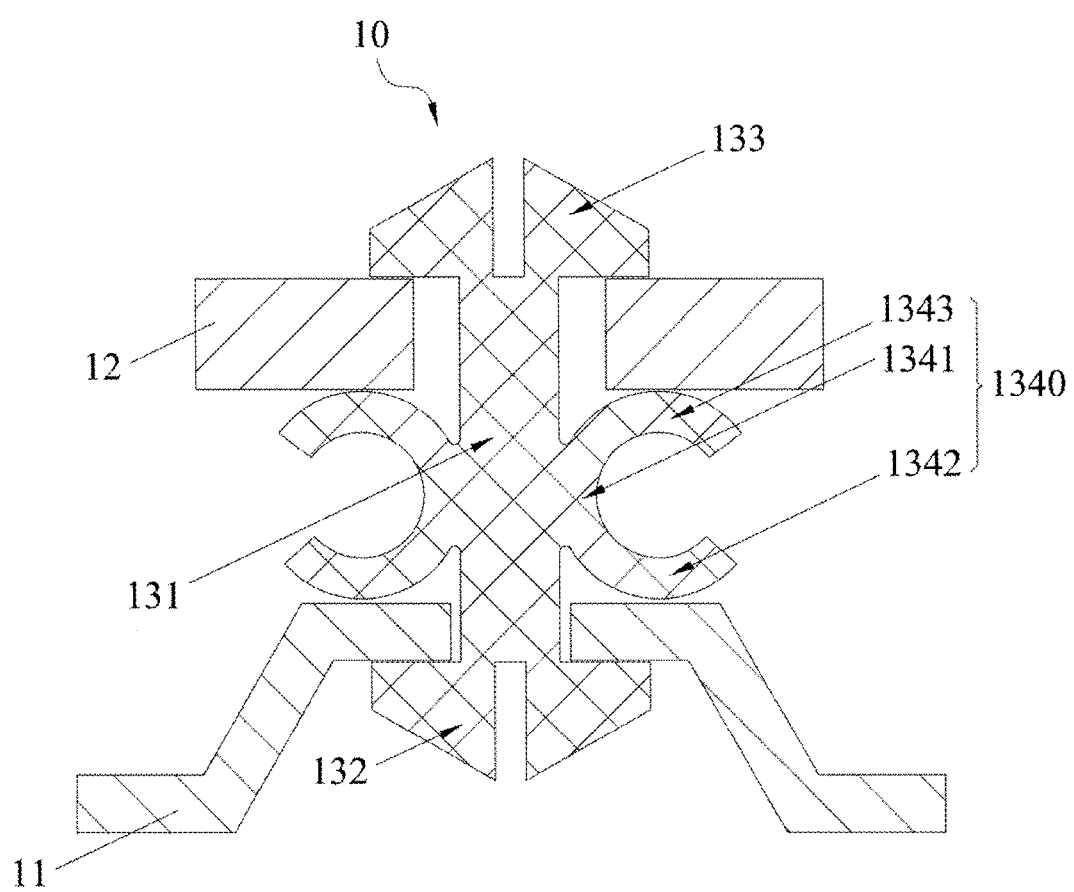
FIG. 4 is a schematically cross-sectional view showing a drive circuit board connection structure provided by still another embodiment of this disclosure.

In one embodiment, referring to FIG. 4, the drive circuit board connection structure provided by an embodiment of this disclosure and the drive circuit board connection structure disclosed in the above-mentioned embodiment are basically the same except for the different that: the support branch 1340 also includes a first protruding portion 1342. Here, the first protruding portion 1342 pushes against the back cover 11, and the first protruding portion 1342 is joined to the root 1341. Specifically, the first protruding portion 1342 and the second protruding portion 1343 are symmetrically disposed, and this facilitates the design and processing of the support branch 1340. The first protruding portion 1342 may also swing up and down about the root 1341. When the drive circuit board 12 is subjected to a downward external force, the drive circuit board 12 may press the second protruding portion 1343 to swing downward. At this time, the first protruding portion 1342 swings upward under the pressing of the reaction force of the back cover 11. When assembled, the first protruding portion 1342 cooperates with the first snap to clamp the back cover 11, so that the connector 13 and the back cover 11 form the positioning without the aids of tools, and the connection between the drive circuit board 12 and the backplane 11 is completed. As such, the support force of the elastic support portion 13 is increased, and the assembly efficiency of the drive circuit board connection structure 10 is improved.

Figure 7:
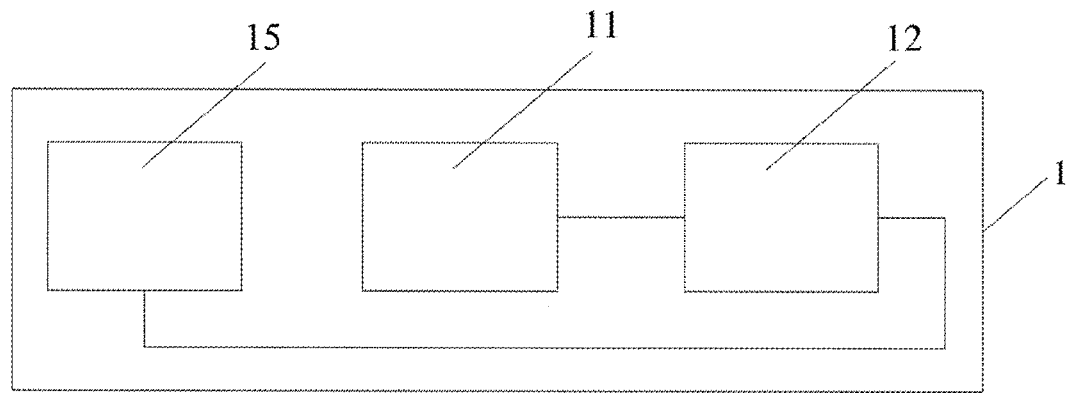
FIG. 7 is a block diagram showing a display device provided by an embodiment of this disclosure.

Referring to FIGS. 1 and 7, this disclosure further provides a display device 1, which includes a display panel 15, a flexible circuit unit 14 and the above-mentioned drive circuit board connection structure 10, wherein the display panel 15 displays an image; the drive circuit board connection structure 10 mounts the drive circuit board 12 on the back cover 11; one end of the flexible circuit unit 14 is fixed and connected to the display panel 15, and the other end of the flexible circuit unit 14 is fixed and connected to the drive circuit board 12. Here, according to actual situations and requirements, the display device may be a LCD display device, an OLED display device, a QLED display device, a curved surface display device or other display devices, but this is not the only limitation.

The display device 1 provided by this disclosure employs the drive circuit board connection structure 10, so that the drive circuit board 12 is connected with the backplane 11 while having the movable margin. The drive circuit board 12 may move a predetermined distance in a direction from the body 131 to the back cover 11, thereby effectively solving the problem that the assembly method can not satisfy the movable margin required by the drive circuit board to automatically adjust its relative position to the display panel, and to avoid the damage of the flexible circuit unit. Thus, the safety of the flexible circuit unit in the transporting process is improved, and the normal operation of the display device is guaranteed.

The drive circuit board connection structure 10 of this disclosure may also be used in other electronic devices, and this is not the only limitation.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A drive circuit board connection structure used in a display device, comprising:
    a back cover;
    a drive circuit board disposed on one side of the back cover; and
    a connector connected between the back cover and the drive circuit board, wherein the connector comprises:
    a body connected between the back cover and the drive circuit board;
    a first connection portion joined to one end of the body and connected to the back cover;
    a second connection portion joined to the other end of the body; and
    an elastic support portion disposed on the body and located between the back cover and the drive circuit board, wherein the elastic support portion and the second connection portion respectively push against two opposite side surfaces of the drive circuit board,
    wherein a first snap is disposed on the first connection portion, a first mounting hole adapted to the first snap is formed on the back cover, the first connecting portion passes through the first mounting hole through the first snap to snap to the back cover, and a second snap is disposed on the second connection portion, a second mounting hole adapted to the second snap is formed on the drive circuit board, and the second connection portion passes through the second mounting hole to snap to the drive circuit board through the second snap,
    wherein the second snap comprises:
    a guide surface guided the second snap to pass through the second mounting hole; and
    a slot provided a deformation margin or cooperating with mounting of the first connecting portion.

2. The drive circuit board connection structure according to claim 1, wherein a surface of a junction of the elastic support portion and the body is an arced surface.

3. The drive circuit board connection structure according to claim 2, wherein the junction of the elastic support portion and the body has an arc-shaped surface.

4. The drive circuit board connection structure according to claim wherein the elastic support portion comprises:
    at least two support branches comprises a root forming an arc transition with the body, and a second protruding portion pushing against the drive circuit board, wherein the second protruding portion is joined to the root.

5. The drive circuit board connection structure according to claim 4, wherein the support branches further comprise a first protruding portion pushing against the back cover, and the first protruding portion is joined to the root.

6. The drive circuit board connection structure according to claim 4, wherein the support branches are distributed over an outer peripheral surface of the body with equal intervals.

7. A display device, comprising:
    a display panel displaying an image;
    the drive circuit board connection structure according to claim 1, which assembles the drive circuit board with the back cover; and
    a flexible circuit unit having one end fixed and connected to the display panel, and the other end fixed and connected to the drive circuit board.

8. The display device according to claim 7, wherein a surface of a junction of the elastic support portion and the body is an arced surface.

9. The display device according to claim 8, wherein the junction of the elastic support portion and the body has an arc-shaped surface.

10. A drive circuit board connection structure used in a display device, comprising:
- a back cover;
- a drive circuit board disposed on one side of the back cover; and
- a connector connected between the back cover and the drive circuit board, wherein the connector comprises:
- a body connected between the back cover and the drive circuit board;
- a first connection portion joined to one end of the body and connected to the back cover, a first snap is disposed on the first connection portion, a first mounting hole adapted to the first snap is formed on the back cover, the first connection portion passes through the first mounting hole through the first snap to snap to the back cover;
- a second connection portion joined to the other end of the body, a second snap is disposed on the second connection portion, a second mounting hole adapted to the second snap is formed on the drive circuit board, and the second connection portion passes through the second mounting hole to snap to the drive circuit board through the second snap; and
- an elastic support portion disposed on the body and located between the back cover and the drive circuit board, wherein the elastic support portion and the second snap respectively push against two opposite side surfaces of the drive circuit board, the elastic support portion comprises at least two support branches, wherein the support branches are distributed over an outer peripheral surface of the body with equal intervals, the support branches comprise a root forming an arc transition with the body and a second protruding portion pushing against the drive circuit board, and wherein the second protruding portion is joined to the root, wherein the second snap comprises:
- a guide surface guided the second snap to pass through the second mounting hole; and
- a slot provided a deformation margin or cooperating with mounting of the first connecting portion.

11. The drive circuit board connection structure according to claim 10, wherein a surface of a junction of the elastic support portion and the body is an arced surface.

12. The drive circuit board connection structure according to claim 11, wherein the junction of the elastic support portion and the body has an arc-shaped surface.

13. The drive circuit board connection structure according to claim 10, wherein the support branches further comprise a first protruding portion pushing against the back cover, and the first protruding portion is joined to the root.

* * * * *